United States Patent
Delbrugge, Jr. et al.

(10) Patent No.: US 7,039,491 B1
(45) Date of Patent: May 2, 2006

(54) METHOD OF ENERGIZING WIRELESS SENSORS IN AN AUTOMATED TOOL AND ASSOCIATED APPARATUS

(75) Inventors: Gerald Vincent Delbrugge, Jr., Indiana, PA (US); E. Wesley Elliott, Lower Burrell, PA (US)

(73) Assignee: Oberg Industries, Freeport, PA (US)

( * ) Notice: Subject to any disclaimer, the term of this patent is extended or adjusted under 35 U.S.C. 154(b) by 0 days.

(21) Appl. No.: 10/737,301

(22) Filed: Dec. 16, 2003

Related U.S. Application Data

(63) Continuation-in-part of application No. 10/718,735, filed on Nov. 21, 2003.

(51) Int. Cl.
*G06F 19/00* (2006.01)

(52) U.S. Cl. ..................... 700/174; 702/183

(58) Field of Classification Search ............... 700/127, 700/174, 175, 177, 190; 702/33, 188, 183, 702/189
See application file for complete search history.

(56) References Cited

U.S. PATENT DOCUMENTS 5,406,502 A * 4/1995 Haramaty et al. .......... 702/183
6,101,857 A * 8/2000 Fox et al. .................... 72/15.1

(Continued)

OTHER PUBLICATIONS

Oppel et al., "Acoustic emission monitoring for stamping presses". Jul. 13, 2004 Stamping Journal.*

(Continued)

*Primary Examiner*—Albert W. Paladini
*Assistant Examiner*—Chád Rapp
(74) *Attorney, Agent, or Firm*—Philip E. Levy; Arnold B. Silverman; Eckert Seamans Cherin & Mellott, LLC

(57) ABSTRACT

A method of monitoring operation of an automated tool includes positioning a wireless sensor or microelectromechanical system device having at least one sensor in close proximity to the automated tool, monitoring at least one condition of the automated tool, emitting signals containing sensor information in space to a processor which processes the sensor information and in the event the processor determines that the automated tool has departed from desired conditions issues a responsive signal. In one embodiment digital signals are transmitted from the sensor to the processor employing an RF carrier. Microprocessor responsive signals may be employed to initiate corrective action and initiate alarms as well as providing data. Corresponding apparatus for monitoring an automated tool is provided. In another embodiment of the invention, the sensor is energized remotely through energy transmitted in space such as RF energy. In a further embodiment of the invention, a wireless, self-powered energy harvesting sensor is operatively associated with the automated tool and responsive to motion of the tool, establishes movement of an electrical conductor within a magnetic field to induce current in the conductor which is electrically connected to the sensors to energize the same.

26 Claims, 9 Drawing Sheets

U.S. PATENT DOCUMENTS

| | | | |
|---|---|---|---|
| 6,122,565 A * | 9/2000 | Wenning et al. | 700/206 |
| 6,259,127 B1 * | 7/2001 | Pan | 257/301 |
| 6,615,074 B1 * | 9/2003 | Mickle et al. | 600/509 |
| 2003/0030565 A1 * | 2/2003 | Sakatani et al. | 340/679 |
| 2004/0078662 A1 * | 4/2004 | Hamel et al. | 714/22 |
| 2004/0090326 A1 * | 5/2004 | Chin et al. | 340/539.22 |

OTHER PUBLICATIONS

"MEMS", Dec. 2, 2004, Techweb.*

U.S. Appl. No. 60/362,432, filed Mar. 2002, Hamel et al.*

Tonshoff et al. "Using acoustic emission signals for monitoring of production processes" Jun. 23, 2000, Ultrasonics vol. 37, issue 10 pp. 681-686.*

Verplaetse, "Inertial proprioceptive devices: Self-motion esnsing toys and tools" 1996 IBM systems Journal, vo. 35 NOS 3 &4.*

* cited by examiner

METHOD OF ENERGIZING WIRELESS SENSORS IN AN AUTOMATED TOOL AND ASSOCIATED APPARATUS

CROSS REFERENCE TO RELATED APPLICATION

This application is a continuation-in-part of U.S. Ser. No. 10/718,735 filed Nov. 21, 2003 entitled "METHOD OF MONITORING OPERATION OF AN AUTOMATED TOOL AND ASSOCIATED APPARATUS".

BACKGROUND OF THE INVENTION

1. Field of the Invention

The present invention relates to an improved method and associated apparatus for facilitating monitoring of an automated tool for one or more operational characteristics in order to detect undesired interference with the operation of the same and, more specifically, it relates to such method and apparatus which employs a wireless sensor such as a microelectromechanical systems device (MEMS) structured to transmit sensor information in space. In one embodiment, the wireless sensor is remotely energized through energy transmitted in space with the sensor rectifying the received energy into DC current and also receiving communications from a remote microprocessor while delivering communications of information originating within the sensor to the remote microprocessor. In another embodiment, the invention provides for wireless self-powered sensors which harvest energy from motion of the automated tool.

2. Description of the Prior Art

It has been known to employ various sorts of sensors in connection with the monitoring of conditions of operating equipment including industrial equipment employed to perform manufacturing functions on workpieces. In such systems the information from sensors is frequently delivered to a controller unit which may employ the sensor data to determine whether an output signal effecting a change in control of the equipment should be generated. See, generally, U.S. Pat. No. 6,101,857, the disclosure of which is incorporated herein by reference.

It has been known to employ microelectromechanical systems (MEMS) devices and associated sensors to detect the various properties such as, for example, vehicle tire pressure. It has also been known to employ sensors which react to acceleration limits employing an inertial response, the calibrated mass and the elastic response of at least part of the sensor geometry. The deflection of the elastic response may be coupled with hardware that utilizes another property to communicate a condition that can be acted upon by the system control.

It has also been known to transmit data and energy between a base unit and a remote station employing RF energy or other sources of energy in the transmission. See U.S. Pat. Nos. 6,289,237 and 6,615,074, the disclosures of which are expressly incorporated herein by reference.

For many uses in automated tools, it is not efficient to run wires or cables in order to energize and communicate with sensors which are monitoring portions of the automated tool for purposes of both protection and performance enhancement. The design of the automatic tool has to be altered to accommodate the same. Among other considerations, the size of the sensors as well as location which relates to distance between the sensor location and the site being monitored are taken into consideration. Further, the structural integrity of the automated tool and the required motion cannot be altered to accommodate sensors and any wiring employed therewith.

In spite of the foregoing teachings, there remains a meaningful need for an improved method of monitoring automated tools for undesired changes in operating properties of the system in order to facilitate prompt corrective action.

SUMMARY OF THE INVENTION

The present invention provides a method of operating an automated tool which includes positioning a wireless sensor such as a microelectromechanical system device having at least one sensor in close proximity to the automated tool, monitoring one or more conditions of the automated tool and emitting signals containing sensor information in space to a processor which processes the sensor information and, in the event it determines that the automated tool has departed from desired conditions of operation, issues a responsive signal.

The automated system may, for example, be a manufacturing apparatus working on the fabrication of a workpiece. It may be a progressive stamping die operating on a metal sheet workpiece.

The system, preferably, is wireless and, thereby, permits positioning of the sensor or sensors in close proximity to the region of the automated tool being monitored without requiring wires either as a source of power for the sensors such as a microelectromechanical system device or for communication.

In another embodiment of the invention, a system is provided for use of wireless sensors which are positioned within, or on, or closely adjacent to an automated tool with energy for powering the sensors and associated apparatus as well as permitting two way communication therewith through an antenna being provided in the wireless sensor.

In another embodiment of the invention, the operation of an automated tool is monitored by positioning in close proximity to the automated tool at least one wireless sensor. This wireless sensor is energized by inducing current in an electrical conductor through relative movement between the electrical conductor and a magnetic field. The sensors monitor at least one condition of the automated tool and emit signals containing sensor information in space to a microprocessor with the sensor information being processed in the microprocessor. A permanent magnet may be a source of the magnetic field and relative movement may be established. Relative movement between the magnetic field and the electrical conductor may be effected through mechanical movement or through providing a flexible material on the sensor, as well as other structures, which results in induced current adequate to operate the sensor being provided.

Corresponding apparatus is provided.

It is an object of the present invention to provide a method of efficiently monitoring operation of an automated tool in a wireless manner so as to facilitate close positioning of sensors to the portion of the automated tool being monitored.

It is another object of the present invention to provide a method of employing microelectromechanical systems devices and other types of sensors in monitoring one or more operating conditions of an automated tool to effect early detection of interference.

It is another object of the present invention to monitor motion and force related conditions of the operating automated tool.

It is yet another object of the present invention to effect efficient and timely monitoring so as to resist undesired cost of repair and downtime for the system.

It is a further object of the present invention to provide such a method and related apparatus to enhance the efficiency of performance of automated tools.

It is a further object of the present invention to provide a sensor employable with automated tools which is energized through power transmitted in space as contrasted with having a power storage device on board.

It is another object of the present invention to provide a method and related apparatus wherein a wireless sensor is secured within or on a surface of an automated tool.

It is another object of the present invention to provide a system which employs wireless self-powered sensors in connection with an automated tool.

It is a further object of the present invention to provide such a system wherein the energy harvesting is achieved by taking advantage of motion inherent in operation of the automated tool.

These and other objects of the invention will be more fully understood from the following detailed description of the invention on reference to the illustrations appended hereto.

DESCRIPTION OF THE PREFERRED EMBODIMENTS

As employed herein, the term "automated tool" means a piece of equipment having one or more moving parts structured to engage in repetitive cycles of motion and shall expressly include, but not be limited to industrial manufacturing apparatus which has components that move relative to one another including, but not limited to, apparatus performing operations on a workpiece and equipment having components that can break, deform or wear.

As employed herein, the term "wireless" means that a device of the invention employable in a method of the invention may function efficiently without requiring a hard wired connection for delivering information obtained by a sensor to the processor and without requiring a wire to deliver power to energize the device.

As employed herein, a reference to transmission "in space" means that signals are being transmitted through air or similar medium regardless of whether the transmission is within or partially within an enclosure, as contrasted with transmission by a hard wired route.

As employed herein, the term "sensor assembly" shall refer to one or more sensors and associated components including at least one antenna and a rectifier along with one or more sensors.

Figure 1:
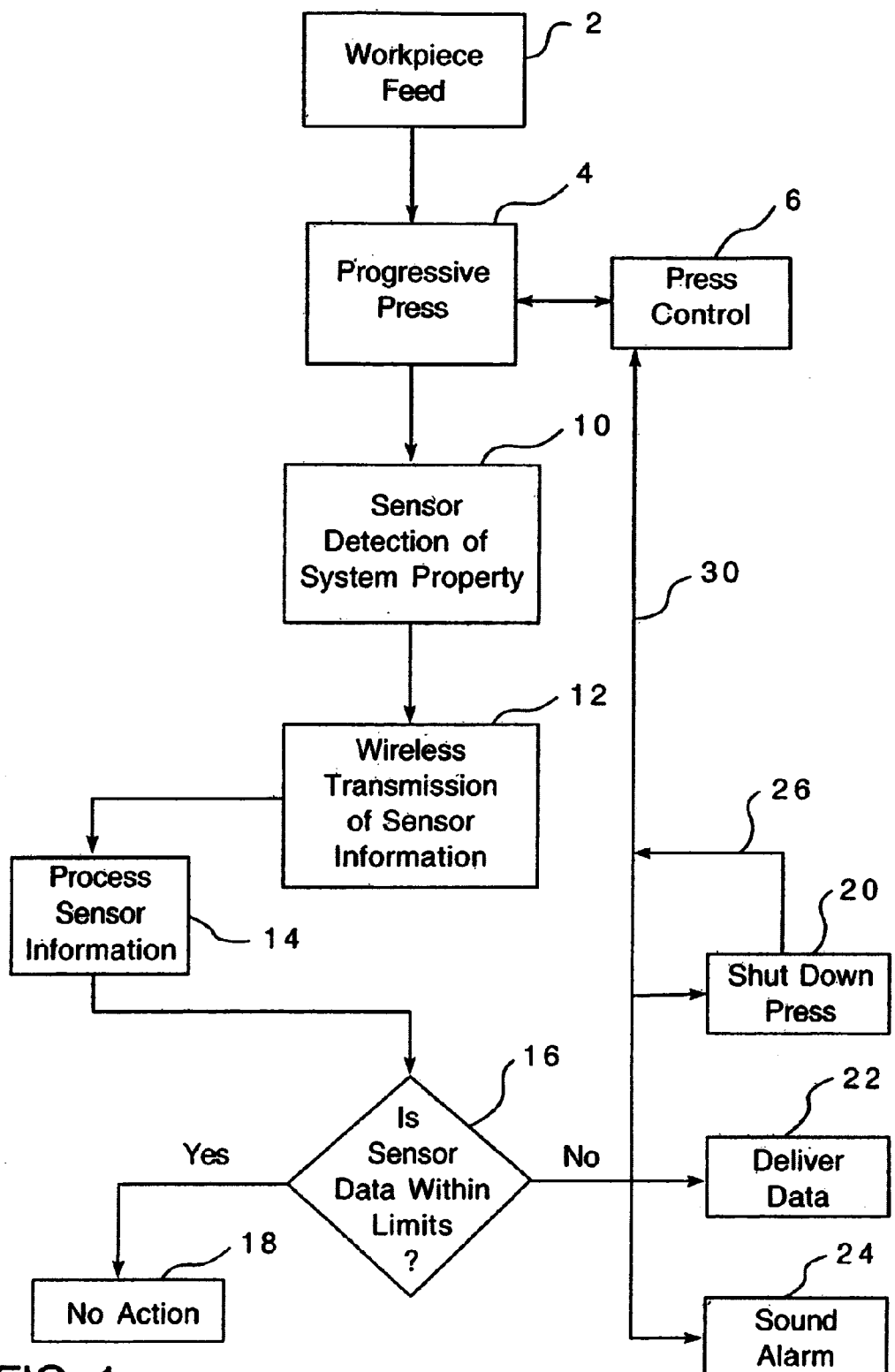
FIG. 1 is a schematic diagram of a form of method of the present invention.

Referring now to FIG. 1 wherein a method of the invention employed with an automated tool performing a function on a workpiece will be considered. The workpiece feed 2 introduces the workpiece which may, for example, be metal sheet into the automated tool which in the form shown is indicated as being a progressive press 4. Progressive press 4 is controlled by press control 6. While other types of sensors may be employed, the preferred form of sensor employed in the present invention is a microelectromechanical system (MEMS) device having one or more sensors. The microelectromechanical system sensor(s) 10 is employed to detect one or more properties of the automatic tool and emits sensor information through wireless transmission 12. The information is preferably processed and data recorded continuously 14 with a determination 16 being made as to whether the sensor data is within the predetermined limits. If the answer is "yes", no action 18 is taken. If the answer is "no", one or more of several alternate actions may be taken. A responsive signal may be emitted to (a) shut down the press 20 through a signal 26, 30 to the press control 6 or (b) to deliver data 22 or (c) to sound an alarm 24 or (d) to deliver signal 30 to the press control 6 in order to initiate corrective action other than shutting down of the press or any desired combinations of responsive signals may be employed.

Figure 2:
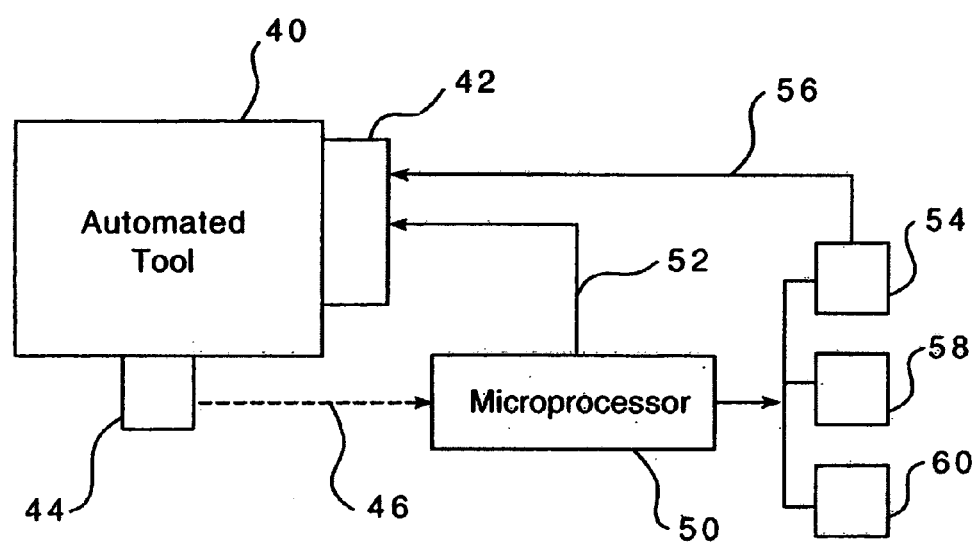
FIG. 2 is a schematic illustration of a form of apparatus employable in the present invention.

Referring now to FIG. 2, there is shown automated tool 40 controlled by controller 42 with a microelectromechanical device sensor 44 monitoring one or more conditions and providing sensor information 46 through space to a microprocessor 50, preferably as digital information and employing an RF carrier. The microprocessor 50 effects a comparison between the sensor information transmitted in signal 46 with the stored desired parameters in order to make the comparison 16 referred to in FIG. 1. The result may be to deliver this information by signal 52 to controller 42 or to shut down the automated tool 40 through unit 54 and signal 56 or to deliver data which may be presented in any desired form as in hard copy form or by computer monitor with or without intervening storage or enhancement 58 or to sound an alarm 60.

In the alternative, if desired, the sensor device 44 may be so created as by a smart microchip so as to emit signals 46 only when there has been a departure from the desired characteristics.

In general, the microelectromechanical system device and sensors may be energized by a battery operatively associated therewith or may be remotely provided with energy through an onboard capacitor which is remotely charged or by energization such as disclosed in U.S. Pat. No. 6,289,237 or 6,615,074.

Figure 3:
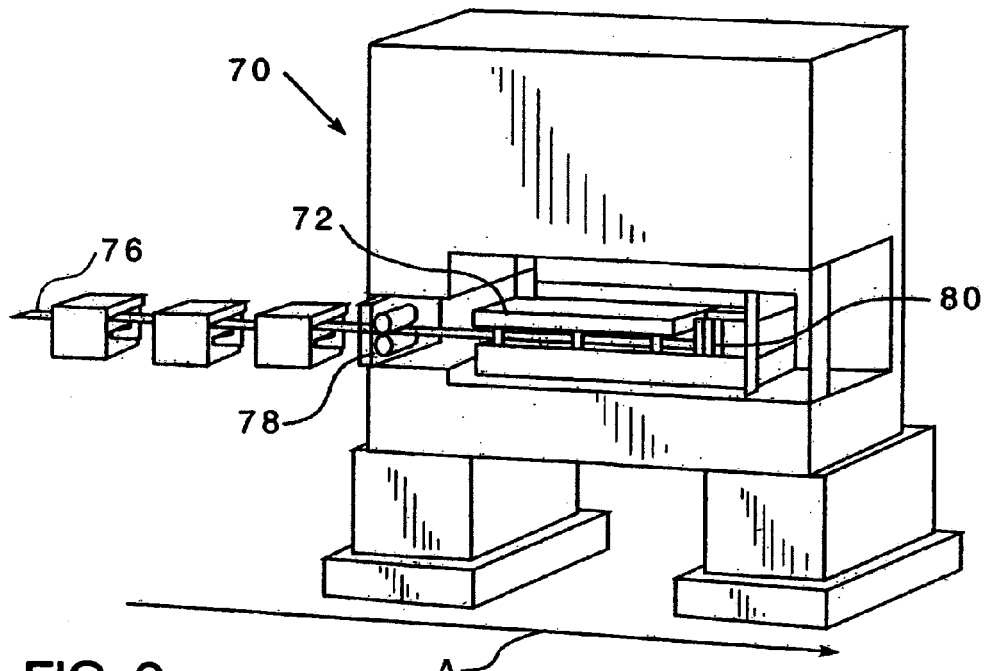
FIG. 3 is a partially schematic illustration of an automated tool employable in the progressive performance of operations on a workpiece.

Referring now to FIG. 3, there is shown an automated tool in the form of a progressive stamping press for sequentially creating fabricated or semifabricated articles such as, for example, rotors or stators, by means of a punch press 70 and an associated progressive die set 72. In the form illustrated, the workpiece which is metal strip 76 travels into the press 70 and through the press 70 in the direction indicated by arrow A. A roll feed 78 serving to intermittently advance the workpiece through the die sets 72 in coordination with press operation. A microelectromechanical system device having an appropriate sensor or sensors of the present invention may be positioned at point 80, for example, in order to monitor for various conditions such as improper web feed. It will be appreciated that, in view of the wireless nature of the present microelectromechanical system device and its associated sensor or sensors, the device may be positioned in close proximity to the condition being monitored.

Figure 4:
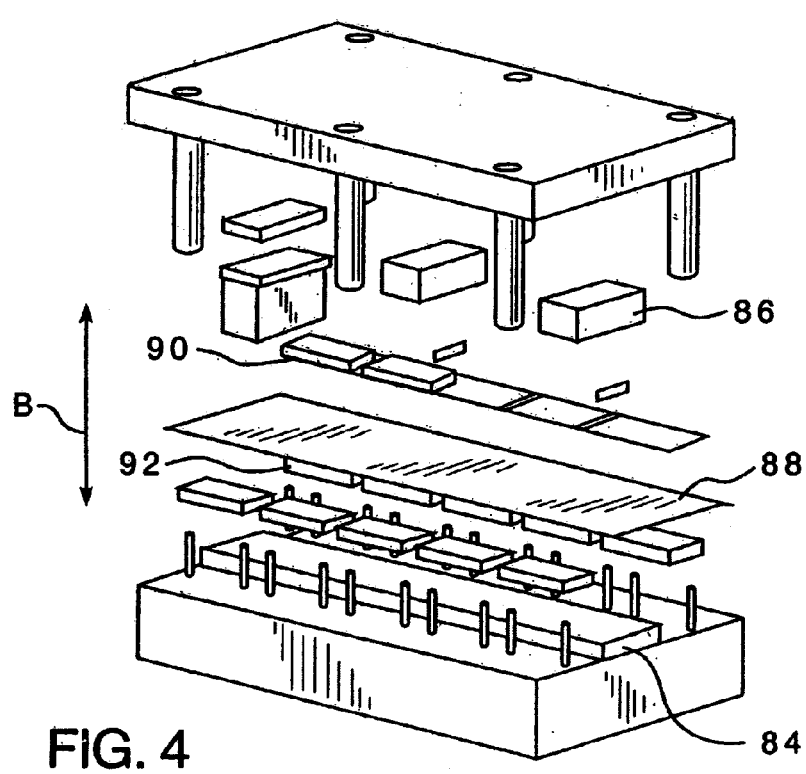
FIG. 4 is an exploded schematic view of a form of progressive die design showing dies usable in the press of FIG. 3.

Referring to FIG. 4, there is shown an example of a progressive die set usable in the press 70 shown in FIG. 3. The punch and die are subjected to relative movement through generally vertical reciprocation as indicated by the two headed arrow B. A die half 84 cooperates with a punch half 86 to perform the desired multistage fabrication on metal strip 88 with an appropriate lifter/stock guide 90 being provided above the workpiece 88 and a lifter/stock guide 92 being provided thereunder.

Figure 5:
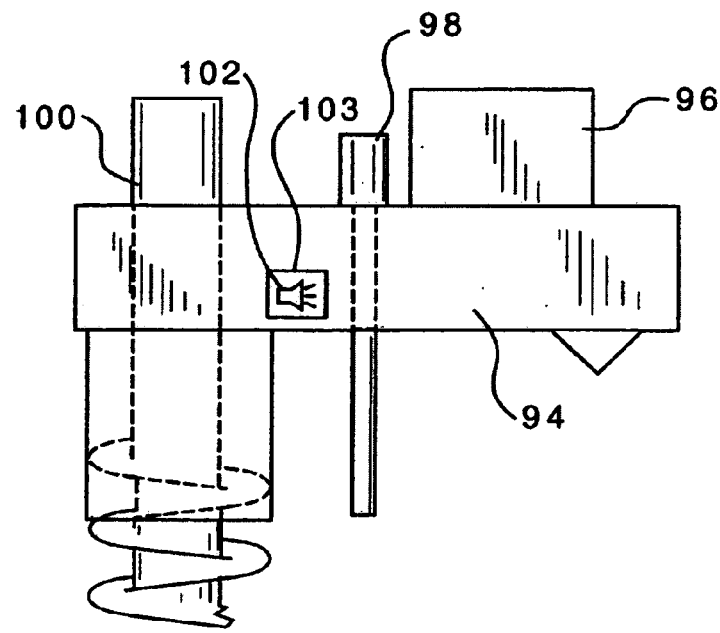
FIG. 5 illustrates a segment of the die and workpiece feed employed with a sensor of the present invention.

Referring to FIG. 5, there is shown in plan schematically the metal workpiece strip 94 and the associated support and restraining elements 96, 98, 100 with a microelectromechanical system device 102 shown as being embedded in the metal. The sensor 102 may be embedded in a hole in the material 94 or otherwise secured thereto.

The sensors may be of nano scale, which allows them to be part of the billet of material without significantly affecting the physical or mechanical properties of the metal strip.

The microelectromechanical system device may be employed to detect temperature or position of an automated tool component or detect excessive differential velocity with respect to time and subsequently transmit digital information using an RF carrier signal to a receiver for appropriate processing. Time-dependent differential velocity is proportional to acceleration and, as a result, force, and is related to the amount of resistance to kinematics or motion of the automation.

It will be noted that a preferred form of sensor is an inertial sensor which contributes to monitoring of kinematic aspects of the automated tool.

It will be appreciated that the hereinbefore described advantages of the invention may be achieved in this manner with sensor systems requiring wiring, not being capable of functioning in this manner.

It will be appreciated, therefore, that the present invention provides an improved means for monitoring automated tools for early and effective detection of undesired interference so that prompt action can be taken. By employing a wireless system, the microelectromechanical system device may be placed for the most efficient viewing of the property being monitored. By transmitting in a wireless fashion, the processor and associated units receiving output therefrom may operate efficiently as well.

Figure 6:
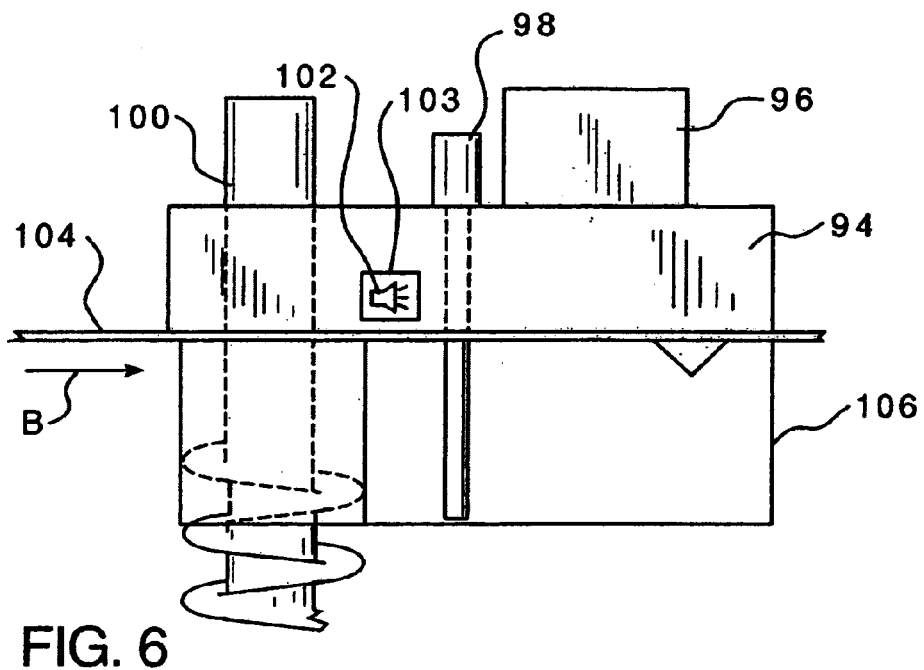
FIG. 6 is similar to FIG. 5, but shows the die in a closed position with a strip-like workpiece clamped therebetween.

In the form shown in FIG. 6, with the workpiece in the form of a metallic strip clamped between die components 104 and 106, the sensor 102 would of necessity have to be wireless as a wire would be crushed between the die components in the closed position.

Figure 7:
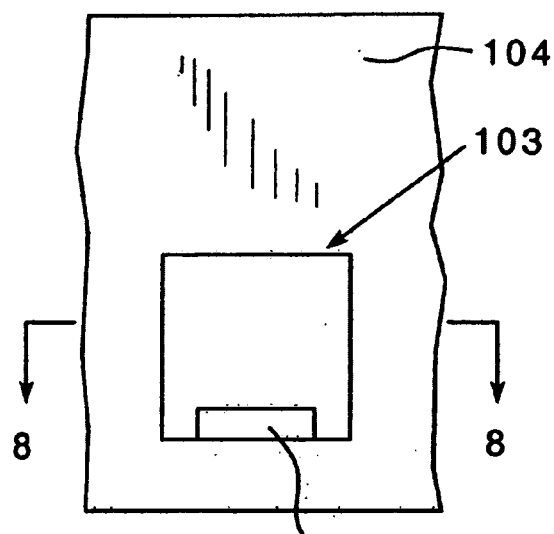
FIG. 7 is a fragmentary illustration of an opening in the apparatus with a sensor of the invention placed therein.
Figure 8:
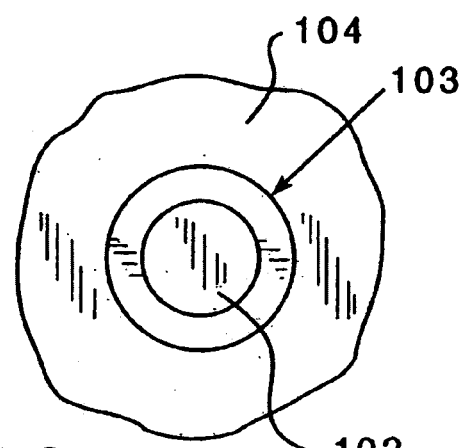
FIG. 8 is a cross-sectional illustration taken through 8—8 of FIG. 7 showing a recess in the die with a sensor positioned therein.

Referring to FIGS. 7 and 8, it is seen that a recess 110 is defined within die component 104 with a sensor 112 provided therein.

Figure 9:
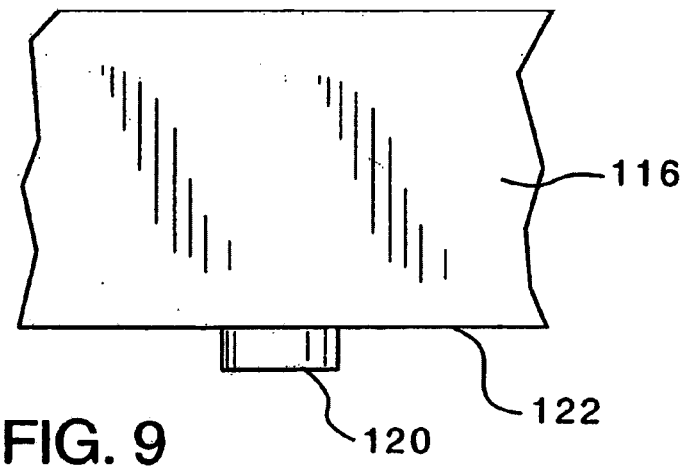
FIG. 9 is an illustration of an embodiment of the invention wherein the sensor is secured to an exterior surface of the apparatus.

In the embodiment shown in FIG. 9, the die component 116 has the sensor 120 secured to an exterior surface 122. In either event, the sensor will be in a position in close proximity or within the automated tool, but not be in a position where it would come into potentially damaging contact with the workpiece or other components of the automated tool.

Figure 10:
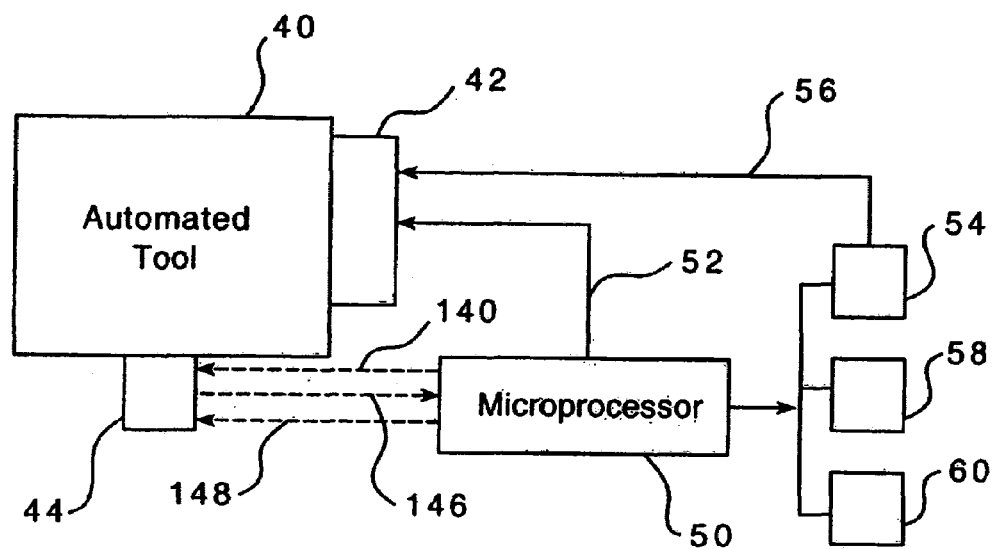
FIG. 10 shows an automated tool and associated microprocessor and sensor arrangement with the delivery of energy and information to the sensor and delivery of information from the sensor to a microprocessor.

Referring to FIG. 10 wherein like reference numbers to the elements shown in FIG. 2 refer to the same elements, it will be seen that the concept involves the sensor receiving through space power 140 which may be in the form of RF energy, for example, which may be converted to DC energy through rectification within the assembly of sensor 44 with the resultant interrogation of the sensor or sensors providing communication of data in space as represented by 146 with data or other information 148 being provided in space from the microprocessor 50 to the sensor 44.

Figure 11:
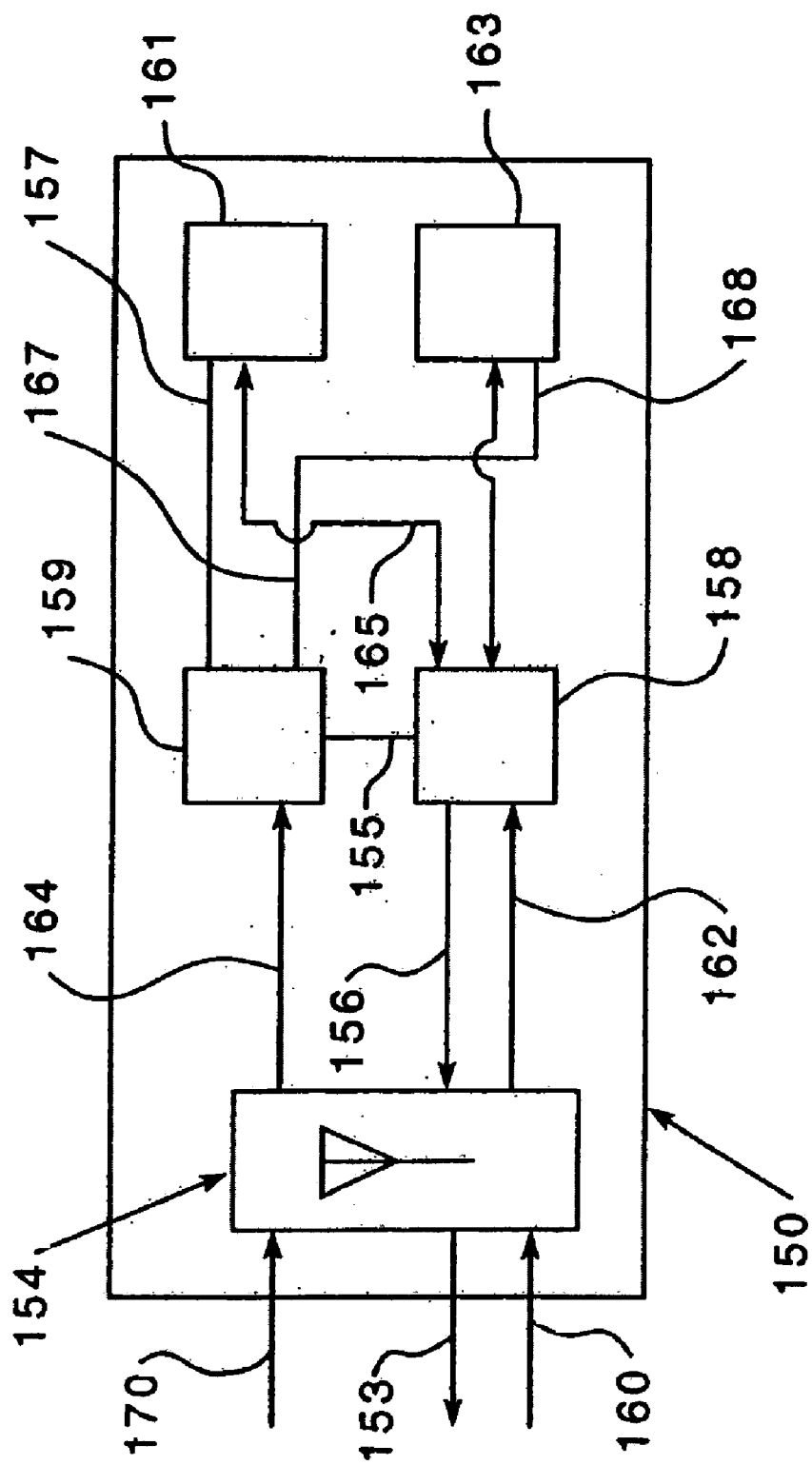
FIG. 11 is a schematic illustration of a form of sensor assembly including representations of data and power transmission through space.

Referring to FIG. 11, there is shown a sensor assembly 150 which, in the form shown, contains sensors 161, 163 as well as rectifier 159 for converting the energy (represented by lines 164, 170) transmitted in space as represented by signal 170 entering an antenna 154 and signal 164 moving from the antenna 154 to the rectifier 159. The rectified DC power is delivered to sensor 161 over electrically conductive path 157, to sensor 163 over electrically conductive path 167 and to microprocessor 158 over electrically conductive path 155. Information signal 160 delivered to sensor assembly 150 through space from a base unit as shown, for example, in FIG. 10, will be received by antenna 154 and pass in the form of information signal 162 to microprocessor 158 which is in communication with sensors 161, 163 through electrically conductive paths 165, 168, respectively. The microprocessor 158 also receives information from sensors 161, 163 and delivers the information over by signal 156 through antenna 154 to signal 153 which is transmitted to the desired base unit which has an antenna for receiving information signal 153 and introducing it into a microprocessor such as 50 in FIGS. 2 and 10.

Figure 12:
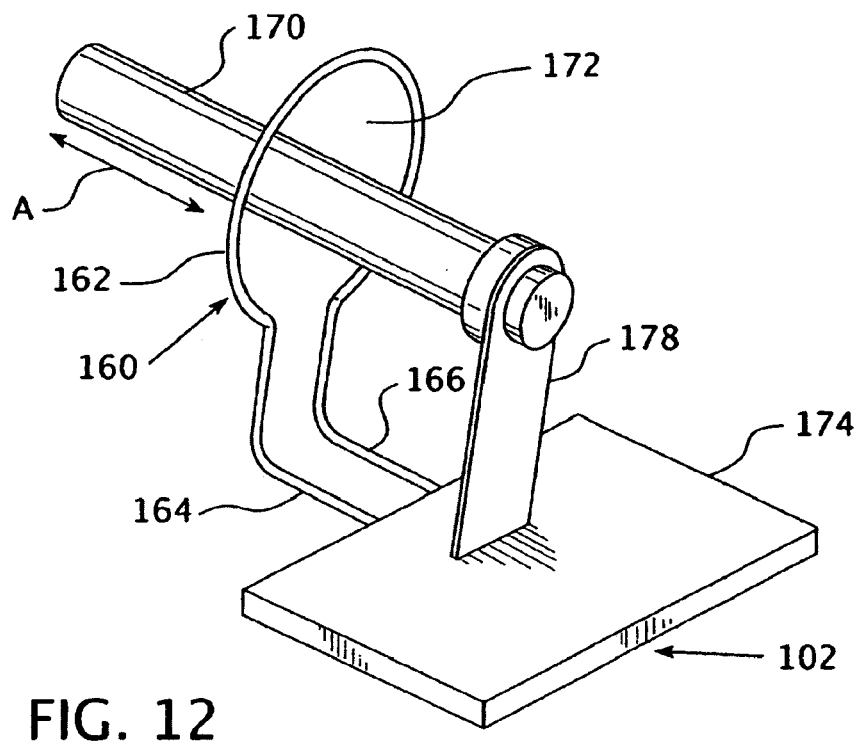
FIG. 12 is a schematic illustration of a form of self-powered energy harvesting wireless sensor employable in an automated tool.

Referring to FIGS. 5, 6 and 12, there will be discussed a form of sensor 102 which may be of any desired size and type suitable for the purpose, including a microelectromechanical system (MEMS) device and sensors or others as disclosed herein or as otherwise known to those skilled in the art. The sensor may, as shown in FIG. 11, provide for desired duplex communications in two directions between the sensor and a cooperating base unit, but would not require a power input as the sensor in this embodiment of the invention will be self-powered through energy harvesting. It is known from Faraday's law of induction that relative movement created between an electrical conductor and a magnetic field induces electrical eddy currents in the conductor. Faraday's law of induction serves to quantify the electromotor force that results in the current flow. Among the characteristics that alter and influence the current induction are changes in the magnetic field vector and orientation and/or motion of the electrical conductor relative to the magnetic field vector.

If the conductor is part of a closed conducting electrically conductive path, then relative motion of at least part of the conductive path will result in a net current through the entire conductive loop.

Among the types of sensors 102 which might be employed in the present invention are wireless accelerometers, such as a MEMS accelerometer, which through induction will generate the electrical power required to operate the sensor and communicate information therefrom by transmitted signals such as RF signals, for example. Sensor acquired information is transmitted to a base unit having a microprocessor.

Referring to the embodiment shown in FIG. 12, electrically connected to the sensor 102 in order to energize the same, is a conductive loop 160 which consists of a loop portion 162 and a pair of parallel legs 164, 166 which when a current is induced in the conductive loop 160 serve to energize the sensors. An elongated permanent magnet 170 which may be generally cylindrical and have a diameter of about a few nanometers or greater employing semiconductor technology passes through opening 172 of the conductive loop 160 with respect to which it is in relative spaced relationship. The magnet 170 is connected to the sensor 102 at base unit 174 by a leaf spring on 178 which serves to reciprocate the magnet in the directions shown by arrow A as the automated tool is subjected to motion. This movement of the magnet 170 relative to the conductive loop 160 serves to induce electrical current in the conductive loop 160 which, in turn, energizes the sensor 102.

Figure 13:
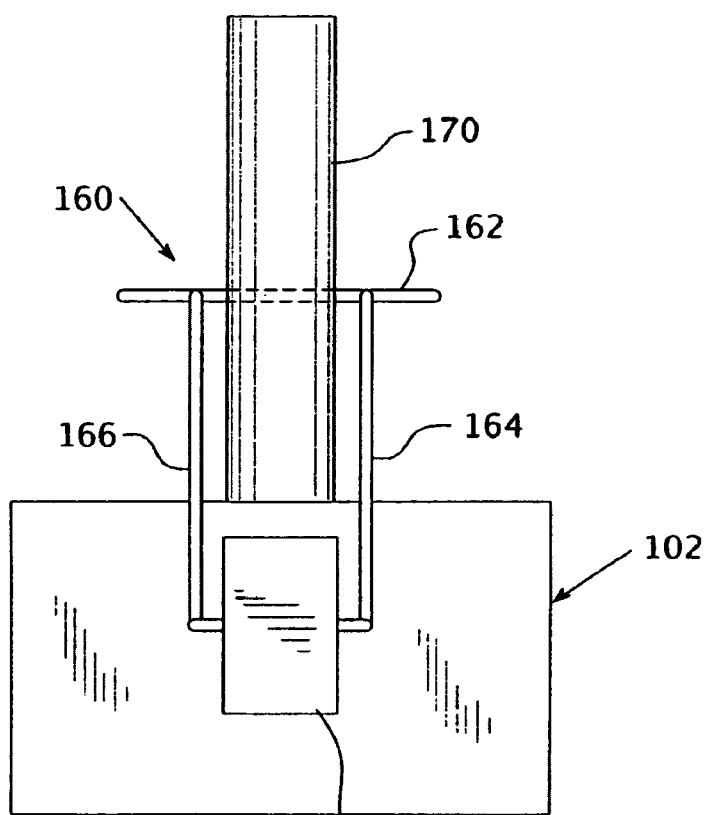
FIG. 13 is a bottom plan view showing the conductive loop, integrated circuit chip and undersurface of the sensor assembly 102.

Referring to FIG. 13, there is shown the undersurface of sensor 102 which has an integrated circuit chip 175 which contains suitable antennas for duplex communication and the desired components for energizing the sensor and providing signals from the sensor through the antenna to the base unit containing the microprocessor (not shown in this view). The legs 164, 166 from the electrically conductive loop 160 through which the magnet 170 passes are also shown.

In an alternate embodiment, in lieu of relying on the mechanical action of the leaf spring responsive to motion of the automated tool, other approaches to establishing relative motion between a magnet which generates a field and an electrical conductor positioned in the field may be employed. For example, as shown in FIG. 13, the sensor may as a result of the material selected have elastic properties which permit it to be subjected to elongation, bending and/or tortion responsive to motion of the automated tool and, thereby, effect relative movement between the electrical conductor within which the current is induced and the magnetic field.

With respect to sensors in the form of accelerometers, it will be appreciated that the sensor only needs electrical energy when it communicates acceleration beyond the desired limit as in a smart device.

A system of this embodiment of the present invention may be operated in such a manner that the sensor only operates within specific portions or ranges of the periodic cycle of the automated tool. The operation of the sensor may be controlled by the microprocessor sending appropriate communication signals to the sensor 102 such that the sensor functions as a smart device.

Figure 14:
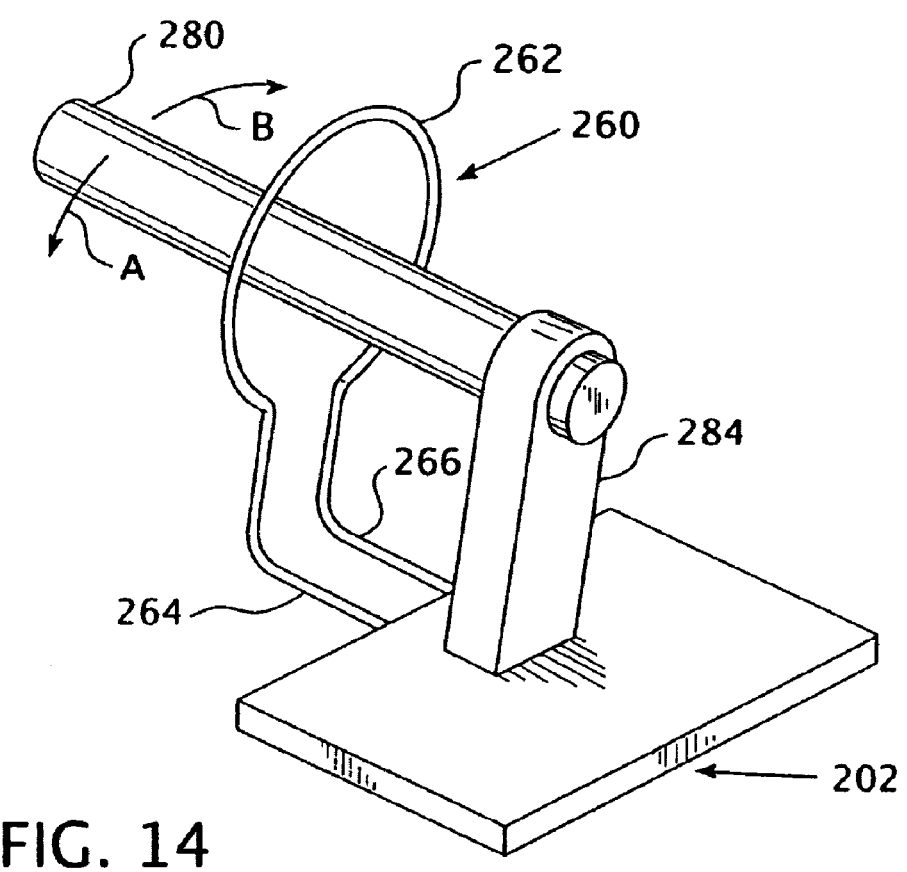
FIG. 14 is a schematic illustration of an embodiment of the invention wherein relative movement between a magnetic field and a conductive loop is achieved through flexibility of the magnetic field generating element.

As shown in FIG. 14, a sensor 202 has a conductive loop 260 having loop portion 262 and legs 264, 266 electrically conductive and operatively associated with the underlying IC chip or a printed circuit board. Extending through the conductive loop 260 is a magnetic field generating element composed of an elastic material and secured to the sensor by base clamp 284. The elastic material will have ferromagnetic properties and may be fabricated employing lithography ion implantation and micromachining, for example. Responsive to physical movement of the automated tool, the elastic material will move such as in directions A and B, thereby inducing the desired current in conductive loop 260.

In this manner, the energy for the wireless sensor is provided remotely along with whatever communication is desired, while outgoing communication from the sensor is also provided all through antenna 154.

It will be appreciated that the sensor assembly may be miniaturized and antenna may conveniently be operatively associated with the sensors on an intelligent chip or a printed circuit board, for example.

Whereas particular embodiments of the invention have been described herein for purposes of illustration, it will be appreciated by those skilled in the art that numerous variations of the details may be made without departing from the invention as described in the appended claims.

What is claimed is:

1. A method of monitoring operation of an automated tool comprising positioning in close proximity to said automated tool at least one wireless sensor, energizing said wireless sensor by inducing current in an electrical conductor through relative movement between said electrical conductor and a magnetic field, monitoring at least one condition of said automated tool by said sensor, emitting signals containing sensor information in space to a microprocessor only if said at least one condition departs from a desired threshold value, and processing said sensor information in said microprocessor.

2. The method of claim 1 including in the event that the microprocessor determines that said automated tool has departed from desired conditions of operation issuing a responsive signal.

3. The method of claim 1 including effecting said relative movement by movement of a source of said magnetic field with respect to said electrical conductor.

4. The method of claim 3 including employing a permanent magnet as said source of said magnetic field.

5. The method of claim 4 including employing as said electrical conductor an electrically conductive loop, and extending said permanent magnet through said electrically conductive loop.

6. The method of claim 5 including a spring operatively associated with said permanent magnetic to effect movement of said permanent magnet responsive to movement of said automated tool.

7. The method of claim 1 including providing a flexible material on said sensor, and effecting said relative movement between said electrical conductor and said magnetic field by distortion of said flexible sensor.

8. The method of claim 1 including employing said method to monitor a said automatic tool performing an operation on a workpiece.

9. The method of claim 1 including
said at least one sensor being a microelectromechanical system device.

10. The method of claim 1 including
employing a plurality of said sensors in said method.

11. The method of claim 9 including
measuring by said microelectromechanical system device at least one motion-related characteristic of said automated tool.

12. The method of claim 1 including
employing as said automated tool a progressive stamping press operating on a metal sheet workpiece.

13. The method of claim 1 including
transmitting said sensor signals to said microprocessor employing an RF carrier.

14. The method of claim 13 including
transmitting said sensor information as digital information.

15. The method of claim 14 including
employing said method to monitor misfeed.

16. Apparatus for monitoring operation of an automated tool comprising
an automated tool,
at least one wireless sensor for monitoring a condition of said automated tool and emitting signals through space only it a monitored condition departs from a desired threshold value,
said sensor being a wireless sensor having an electrical conductor mounted for relative movement with respect to a magnetic field such that relative movement therebetween will induce electrical current in said electrical conductor for energizing said sensor, and
a microprocessor for receiving said sensor signals and determining the departure from a desired characteristic exists and, if so, emitting a responsive signal.

17. The apparatus of claim 16 including
a source of said magnetic field being a permanent magnet.

18. The apparatus of claim 17 including
said electrical conductor being an electrically conductive loop operatively associated with said sensor for energizing the same, and
said elongated permanent magnet extending through the opening in said electrically conductive loop.

19. The apparatus of claim 18 including
a spring operatively associated with said permanent magnet to establish relative movement of the same with respect to said electrical conductor responsive to movement of said automated tool.

20. The apparatus of claim 17 including
said sensor being composed in part of a flexible material which is structured to create relative movement between said electrical conductor and said permanent magnet responsive to movement of said automated tool.

21. The apparatus of claim 16 including
said at least one said wireless sensor being a microelectromechanical system device.

22. The apparatus of claim 21 including
said apparatus having a plurality of said sensors.

23. The apparatus of claim 16 including
said automated tool being a progressive stamping press for performing operations on a metal sheet workpiece.

24. The apparatus of claim 21 including
said microelectrical system device being structured to monitor acceleration related conditions.

25. The apparatus of claim 16 including
said microprocessor being structured to issue a responsive signal in the event it determines that said automated tool has departed from desired conditions of operation.

26. The apparatus of claim 25 including
said microprocessor responsive signals being selected from a group consisting of an automated tool shutdown signal, an alarm signal and the data delivery signal.

* * * * *

UNITED STATES PATENT AND TRADEMARK OFFICE
CERTIFICATE OF CORRECTION

PATENT NO.         : 7,039,491 B1
APPLICATION NO. : 10/737301
DATED              : May 2, 2006
INVENTOR(S)        : Gerald Vincent Delbrugge, Jr. et al.

It is certified that error appears in the above-identified patent and that said Letters Patent is hereby corrected as shown below:

Col. 9, line 26, "it" should read --if --.

Col. 9, lines 30-31, "ther-ebetween" should read --there-between --.

Signed and Sealed this

First Day of August, 2006

JON W. DUDAS
*Director of the United States Patent and Trademark Office*